United States Patent
Verma et al.

(10) Patent No.: US 11,228,961 B2
(45) Date of Patent: Jan. 18, 2022

(54) COST EFFECTIVE DELIVERY OF NETWORK CONNECTIVITY TO REMOTE AREAS

(71) Applicant: International Business Machines Corporation, Armonk, NY (US)

(72) Inventors: Dinesh C. Verma, New Castle, NY (US); Ramya Raghavendra, New York, NY (US); Bong Jun Ko, Harrington Park, NJ (US); Mudhakar Srivatsa, White Plains, NY (US); Nirmit V. Desai, Yorktown Heights, NY (US); Raghu Kiran Ganti, White Plains, NY (US); Shiqiang Wang, White Plains, NY (US); Supriyo Chakraborty, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 16/811,094

(22) Filed: Mar. 6, 2020

(65) Prior Publication Data
US 2021/0282067 A1      Sep. 9, 2021

(51) Int. Cl.
*H04W 40/22*      (2009.01)
*G08G 5/00*       (2006.01)
*H04W 84/04*      (2009.01)

(52) U.S. Cl.
CPC ............ *H04W 40/22* (2013.01); *G08G 5/003* (2013.01); *H04W 84/047* (2013.01)

(58) Field of Classification Search
CPC ..... H04W 40/22; H04W 84/047; G08G 5/003
See application file for complete search history.

(56) References Cited

U.S. PATENT DOCUMENTS

| | | | |
|---|---|---|---|
| 9,260,028 B2 | 2/2016 | Worley, III et al. | |
| 9,854,408 B2 | 12/2017 | Suthar et al. | |
| 10,073,449 B1* | 9/2018 | Sait | ...... G05D 1/0027 |
| 10,164,702 B2 | 12/2018 | Hasegawa | |

(Continued)

FOREIGN PATENT DOCUMENTS

| | | |
|---|---|---|
| GB | 2565558 A | 12/2018 |
| GB | 2563559 A | 2/2019 |

OTHER PUBLICATIONS

Yang et al., "A Telecom Perspective on the Internet of Drones: From LTE-Advanced to 5G," China Mobile Research Institute, 2018, pp. 1-8.

*Primary Examiner* — Hashim S Bhatti
(74) *Attorney, Agent, or Firm* — Cantor Colburn LLP; Joseph Petrokaitis

(57) ABSTRACT

A computer-implemented method for delivering network connectivity includes receiving, by an edge server, a set of communication packets from a communication device. The method further includes storing, by the edge server, the set of communication packets as part of outbound data. The method further includes determining, by the edge server, that a mobile access point is within a communicable range of the edge server. The mobile access point travels back and forth between the edge server and a base station. The method further includes transmitting, by the edge server, the outbound data to the mobile access point that is within the communicable range.

20 Claims, 5 Drawing Sheets

(56) References Cited

U.S. PATENT DOCUMENTS

| | | | |
|---|---|---|---|
| 10,277,307 B1* | 4/2019 | Vos .................... | H04B 7/18506 |
| 2017/0270314 A1* | 9/2017 | Tsybrovskyy ...... | G06F 11/1458 |
| 2018/0332557 A1 | 11/2018 | Vuornos et al. | |

* cited by examiner

COST EFFECTIVE DELIVERY OF NETWORK CONNECTIVITY TO REMOTE AREAS

BACKGROUND

The present invention relates in general to communication networks and, more specifically, to computer systems and computer-implemented methods configured and arranged to provide cost effective communications network access in underserved remote areas.

In a deregulated environment for telecommunications, areas that are remote, particularly with a population density below a certain threshold, do not receive a level of connectivity and service that is comparable with the level of connectivity that is available in high population density areas, such as urban areas. One reason for this is that the cost of providing connectivity to low population density areas makes providing service in these areas unprofitable.

SUMMARY

According to one or more embodiments of the present invention, a computer-implemented method for delivering network connectivity includes receiving, by an edge server, a set of communication packets from a communication device. The method further includes storing, by the edge server, the set of communication packets as part of outbound data. The method further includes determining, by the edge server, that a mobile access point is within a communicable range of the edge server. The mobile access point travels back and forth between the edge server and a base station. The method further includes transmitting, by the edge server, the outbound data to the mobile access point that is within the communicable range.

According to one or more embodiments of the present invention, a system includes a communication device, and an edge server that performs a method for delivering network connectivity. The method includes receiving, by the edge server, a set of communication packets from a communication device. The method further includes storing, by the edge server, the set of communication packets as part of outbound data. The method further includes determining, by the edge server, that a mobile access point is within a communicable range of the edge server. The mobile access point travels back and forth between the edge server and a base station. The method further includes transmitting, by the edge server, the outbound data to the mobile access point that is within the communicable range.

According to one or more embodiments of the present invention, a computer program product includes a computer-readable storage media having computer-executable instructions stored thereupon, which when executed by a processor cause the processor to perform a method for delivering network connectivity. The method includes receiving, by the edge server, a set of communication packets from a communication device. The method further includes storing, by the edge server, the set of communication packets as part of outbound data. The method further includes determining, by the edge server, that a mobile access point is within a communicable range of the edge server. The mobile access point travels back and forth between the edge server and a base station. The method further includes transmitting, by the edge server, the outbound data to the mobile access point that is within the communicable range.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
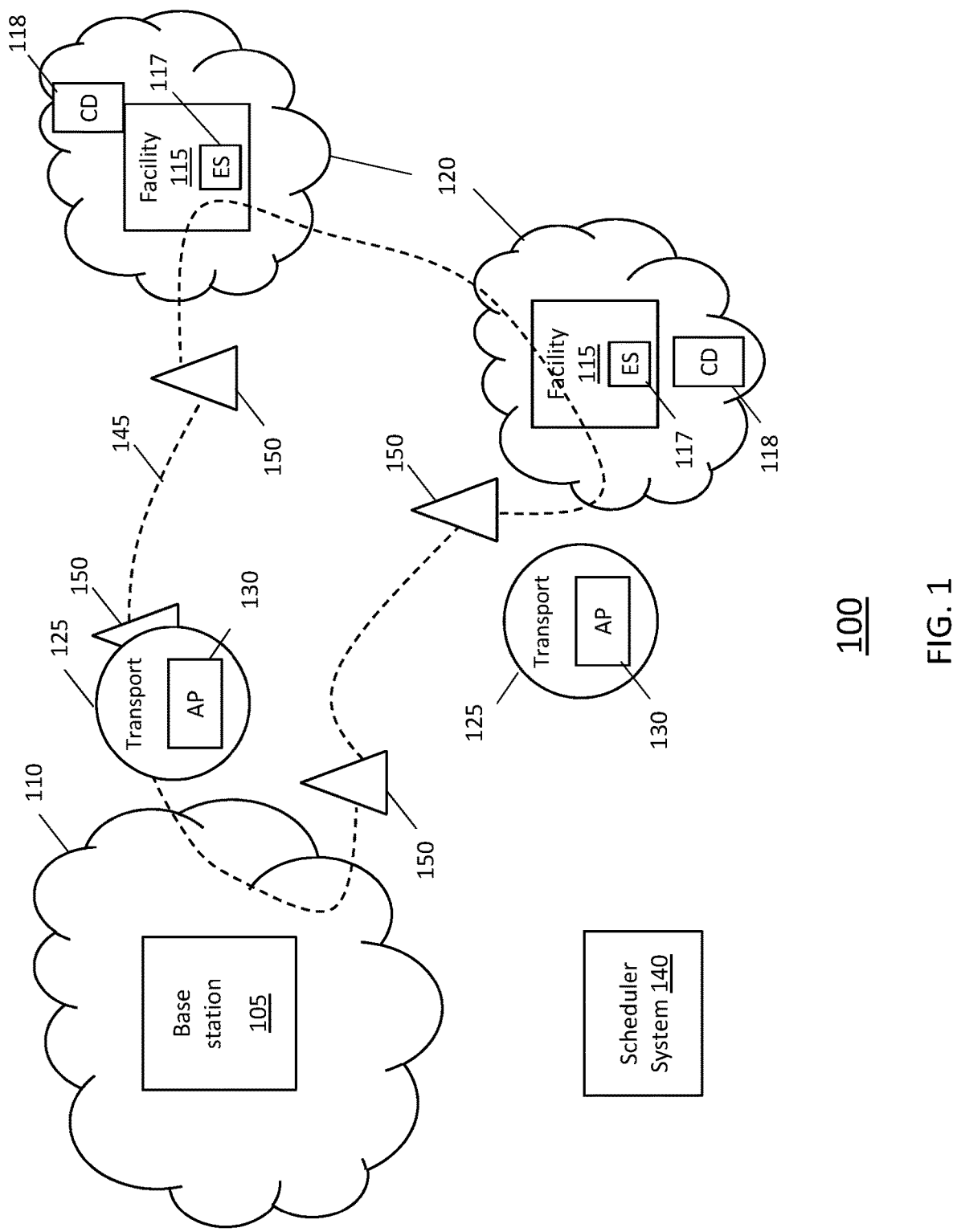
FIG. 1 depicts a block diagram of an example network connectivity system according to one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

DETAILED DESCRIPTION

As noted herein, the cost of providing communication network connectivity to low population density areas is not justifiable on economic grounds to telecommunications service providers. Embodiments of the present invention address such technical challenges by providing technical solutions that facilitate a cost effective connectivity that the telecommunications service providers can use. Accordingly, one or more embodiments of the present invention facilitate a telecommunications service provider to provide connectivity to remote areas with low density of population while still remaining economically viable. According to one or more embodiments of the present invention the connectivity is provided using mobile access points instead of hard wired mobile access points. Such hard wiring, for example, fiber optic cables, to the remote areas can typically have an investment cost that cause the connectivity to the remote areas being infeasible economically.

One or more embodiments of the present invention provide technical solutions in which a mobile access point is included on an unmanned aerial vehicle (UAV), such as a drone, providing better connectivity and are able to charge at a landing station efficiently. Further, in one or more embodiments of the present invention, the mobile access points do not provide a continuous connectivity. Instead they use intermittent connectivity and application level proxies to reduce the cost for network communication delivery. Accordingly, one or more embodiments of the present invention provide an improvement over existing techniques to provide connectivity to remote, low population density areas, by reducing the cost to provide such a service. One or more embodiments of the present invention, accordingly improve computing technology of network communications. Further, one or more embodiments of the present invention provide a practical application to improve the connectivity in the remote, low population density areas.

Consider that a telecommunications service provider can only provide coverage at a reasonable price (that a consumer can practically pay) to a population if the service provider operates a maximum number of M base-stations per P consumers. If each base-station can cover an area of A, the service provider can remain profitable if it provides coverage to population centers where the population density exceeds P/M*A. In remote areas, the population density may be significantly smaller than this threshold, which renders the delivery of connectivity to the remote area economically unviable. In other words, if the number of people in the area A is below a certain threshold, the cost of setting up and maintaining the M base-stations may not be economically viable unless the population in that region is charged fees to cover such cost, which is, typically, impractical.

Alternatively, consider that an area A has a population which needs a maximum of M base-stations to be economically viable for the telecom operator, but is spread over a region R which exceeds MA (the maximum area covered by M base-stations). In this case, the service provider may choose to not cover the area, because only M*A/R of the target revenue to break even can be received from the region R.

One or more embodiments of the present invention facilitate using the minimum number of base-stations and providing network connectivity to such low population density regions, and yet maintaining the economic viability by using mobile base-stations (e.g. base-stations used on drones) which can travel around the region. In one or more embodiments of the present invention, the mobile base-stations provide coverage to different parts of the regions depending on the population, occupancy statistics, and usage patterns in those parts. Accordingly, as described in detail below, one or more embodiments of the present invention facilitate a cost effective connectivity coverage of remote areas, albeit at somewhat degraded network performance.

FIG. 1 depicts a block diagram of an example network connectivity system according to one or more embodiments of the present invention. The network connectivity system 100 includes, among other components, at least one base station 105 that provides a public network 110. The public network 110 can be a telecommunications network that uses communication technology such as 5G, 4G, 3G, Ethernet, or any other such communication technology. The public network 110 facilitates one or more communication devices 118 to communicate with each other and/or with one or more computer servers, cellular network towers, base stations, access points, and other devices that form the telecommunications network and/or the Internet. The communications can be performed via one or more communication protocols such as Internet protocol (IP), Transmission Control Protocol (TCP), User Datagram Protocol (UDP), Address Resolution Protocol (ARP), Voice over IP (VoIP), and any other such network communication protocols. It should be noted that use of a particular protocol is not a limiting aspect for the technical features provided by one or more embodiments of the present invention.

The system 100 further includes one or more remote facilities 115 that are in respective remote areas that are not wired to the base station 105 (or any other base station). The remote facility 115 can be a house, a farm, a library, a workshop, a church, an office building, a restaurant, a rest area, or any other location that can have a communication device 118 in its vicinity. Here, "vicinity" is a predetermined area surrounding the facility 115. The vicinity can be based on a range of communications of a network router or other such device at the remote facility 115 that can facilitate the communication device 118 to send/receive communication packets via a private network 120. Further, here the remote facility 115 being "not wired" indicates that a cable, such as a fiber optic cable, to facilitate communications of one or more communication devices 118 at the remote facility 115 with the public network 110 has not been laid. As noted, this can be because of high cost to lay down such cable(s) for a population that does not meet the economic viability threshold. Hence, the private network 120 is not yet connected to the public network 110. Thus, even if the communication device 118 can send/receive communication packets from a router or other such device at the remote facility 115, the communication device 118 is not yet connected to the public network 110, and hence, does not have connectivity. Accordingly, the remote facility 115 is an under-served area which requires network coverage/connectivity.

In order to address this concern, the system 100 includes, at each remote facility 115, an edge server 117. An edge server is a network device that resides on the "edge" between two networks, typically the private network 120 and the public network 110. The edge server 117 acts as a local access point which provides coverage to the remote facility 115. The edge server 117 is capable of storing a set of communication packets received from the communication device 118 in order to transfer that set over to the base station 105.

To facilitate such a transfer, the number of viable mobile access points 130 (e.g., M access points or X access points where X<M), which makes providing the communication service economically viable, are mounted on respective transport devices 125. For example, a transport device 125 can be a car, a bike, a wagon, a plane, a boat, a hovercraft, a balloon, or any other travelling machine. In one or more embodiments of the present invention, the transport device 125 is unmanned, i.e., does not have a crew or staff on board. For example, the transport device 125 can be controlled remotely. Further yet, in one or more embodiments of the present invention, the transport device 125 is automatic, i.e., is transported automatically by a machine using a predetermined or a dynamic path and/or schedule. For example, the transport device 125 can be an unmanned aerial vehicle (UAV), or a drone, that flies over the remote facility 115.

In one or more embodiments of the present invention, an "access point" 130 is a device that creates a wireless local area network (WLAN). The access point 130 transmits/receives data to/from the base station 105 and the edge server 117. The access point 130 projects a network signal to the edge server 117 and, in turn, to the remote facility 115. The mobile access point 130, upon reaching within a predetermined distance from the edge server 117, establishes a link with the edge server 117 for transmitting/receiving data to/from the edge server 117. In one or more embodiments of the present invention, the mobile access point 130 can store a designated IP address of the edge server 117. Once the edge server 117 is in communicable range with the mobile access point 130, the wireless network link is created. The edge server receives a notification that it is now connected to the mobile access point 130.

Alternatively, or in addition, in one or more embodiments of the present invention, the mobile access point 130 (or the transport device 125) can communicate with the edge server 117 using a second communication link, such as a radio frequency, to identify each other. For example, the mobile access point 130 can include a radio frequency identification (RFID) tag (for example, active tag) that can be identified by the edge server 117 when the transport device 125 is in communicable range. The edge server 117 can then establish the network link with the mobile access point 130 and initiate transmission/reception of data. In one or more embodiments of the present invention, the RFID tag can be on the edge server 117 and the mobile access point 130 establishes the network link. While RFID is one example of a second communication link to identify that the two devices are in communicable range, other techniques can be used to provide such indication.

In one or more embodiments of the present invention, the transport devices 125 travel over the remote facilities 115 in a regular pattern so that each remote facility 115 is covered by a transport device 125 at least every T seconds, T being a predetermined value such as 15 seconds, 60 seconds, 300 seconds, etc. Accordingly, for the remote facility 115, the connectivity is missing only for a period of T seconds. The edge server 117 stores a first set of outbound data from the communication devices 118 for the period of T seconds, and transmits the first set of outbound data to the transport device 125 that next establishes connectivity with the edge server 117. Here, the "outbound" data includes communication packets that the communication devices 118 send to the public network 110. The communication packets (not shown) can include data, commands, data requests, and other such information as per the communication protocol being used. In a similar manner, "inbound" data includes communication packets that the communication devices 118 receive from the public network 110. The transport device 125 transmits such inbound data to the edge server 117. The inbound data is in response to a previous communication between the edge server 117 and one of the transport devices 125. The edge server 117 can subsequently transmit the inbound data to the communication device 118 for which the inbound data is intended.

The transport device 125 travels to the base station 105 and transmits the outbound data that was received from the edge server 117 to the base station 105. In addition, the transport device 125 receives the inbound data from the base station 105 to be transferred to the edge server 117. The remote facility 115 accordingly is provided a network link which has a latency of T+N seconds (where N is the latency of the public network 110). This results in a continued connectivity to the remote facility 115 using the network link established using the transport devices 125. The network link can have larger latency in comparison to a hard wire, however, the network link provides a connectivity bandwidth which that is similar to that of the hard wired network.

In one or more embodiments of the present invention, the edge server 117 can identify and transmit communication packets that are received from the transport device 125 to the intended communication devices 118 using routing information in the communication packets. In one or more embodiments of the present invention, the edge server 117 can maintain a routing table for such routing of packets. Such routing of communication packets can be performed using any technique that is presently known or unknown and does not affect the technical effects and/or features of one or more embodiments of the present invention.

In one or more embodiments of the present invention, the transport devices 125 can stop to recharge, for example, at gas stations, power stations, or any other such charging stations 150. The system 100 includes a scheduler system 140 that provides the transport devices 125 a schedule and a path 145 that is to be followed to cover the remote facilities 115 and would allow charging stops, while maintaining coverage with at the predetermined latency (T). In one or more embodiments of the present invention, the scheduler system 140 transmits travel instructions that are executed by the transport devices 125. In the case where the transport devices 125 are automatic unmanned vehicles, the transport devices 125 follow the instructions automatically using an automated driving systems that can be controlled using processing units such as microcontroller units (MCUS) and/or electronic control units (ECU).

Figure 2:
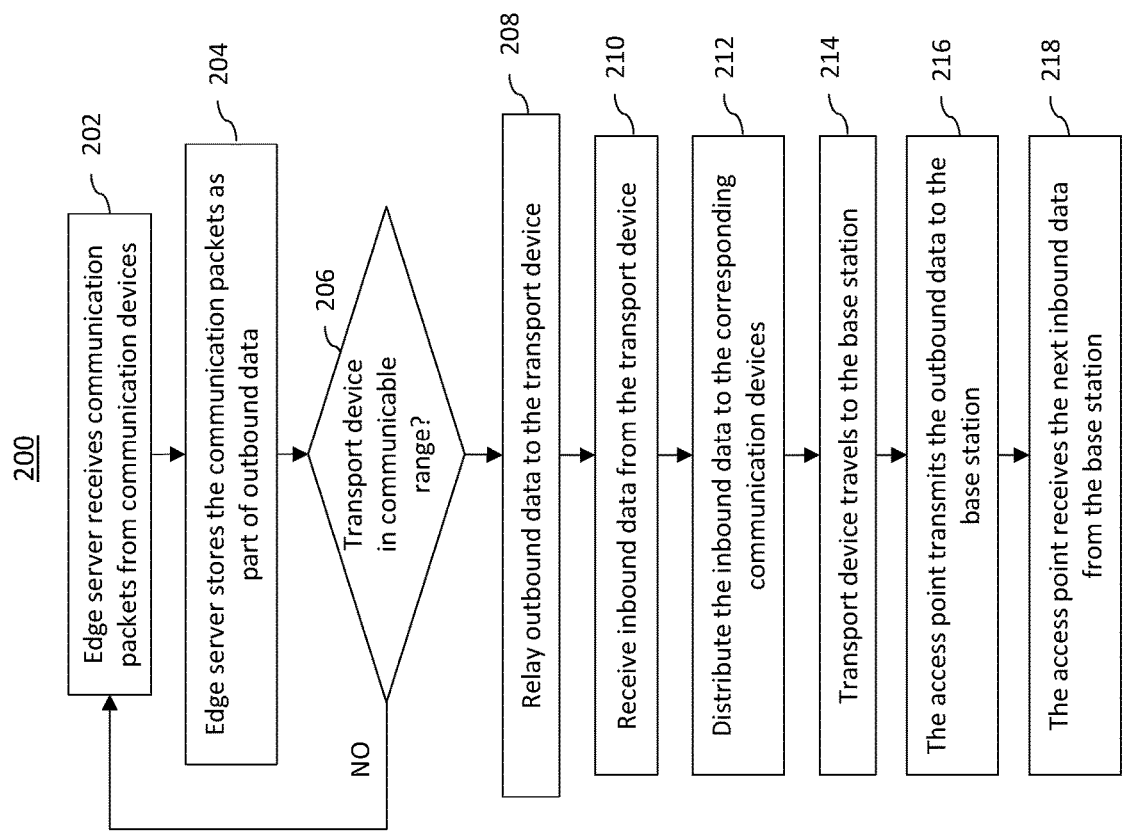
FIG. 2 depicts a flowchart of a method for providing network connectivity according to one or more embodiments of the present invention.

FIG. 2 depicts a flowchart of a method for providing network connectivity according to one or more embodiments of the present invention. The method 200 includes receiving, by the edge server 117, a first set of communication packets from the communication devices 118 that are connected to the private network 120 associated with the edge server 117, at block 202. In one or more embodiments of the present invention, the communication devices 118 that can send communication packets to the edger server 115 are assigned IP addresses by the edge server 117. The edge server 117 stores the first set of communication packets as part of outbound data, at block 204. The edge server 117 continues to accumulate the outbound data until a transport device 125 is in communicable range, at block 206. In one or more embodiments of the present invention, the edge server 117 receives a notification from the transport device 125 upon arrival in the communicable range. Alternatively, or in addition, the edge server 117 is continuously monitoring for the arrival of the transport device 125, for example, by scanning for a RFID.

Once one of the transport devices 125 is in communicable range, the edge server 117 transmits the outbound data to the transport device 125, i.e., the access point 130 on the transport device 125, at block 208. Further, the edge server 117 receives the inbound data from the access point 130 of the transport device 125, at block 210. The edge server 117 further distributes the communication packets from the inbound data to the corresponding communication devices 118 in the private network 120, at block 212. The inbound data is in response to a previous outbound data that the communication devices 118 transmitted to the base station 105 via the transport devices 125.

Further, the method 200 includes traveling, by the transport device 125, to the base station 105 via the scheduled path 145, at block 214. Further, the access point 130 of the transport device 125 transmits the outbound data to the base station 105, at block 216. Further, the access point 130 receives and stores the next set of inbound data from the vase station 105, at block 218.

Figure 3:
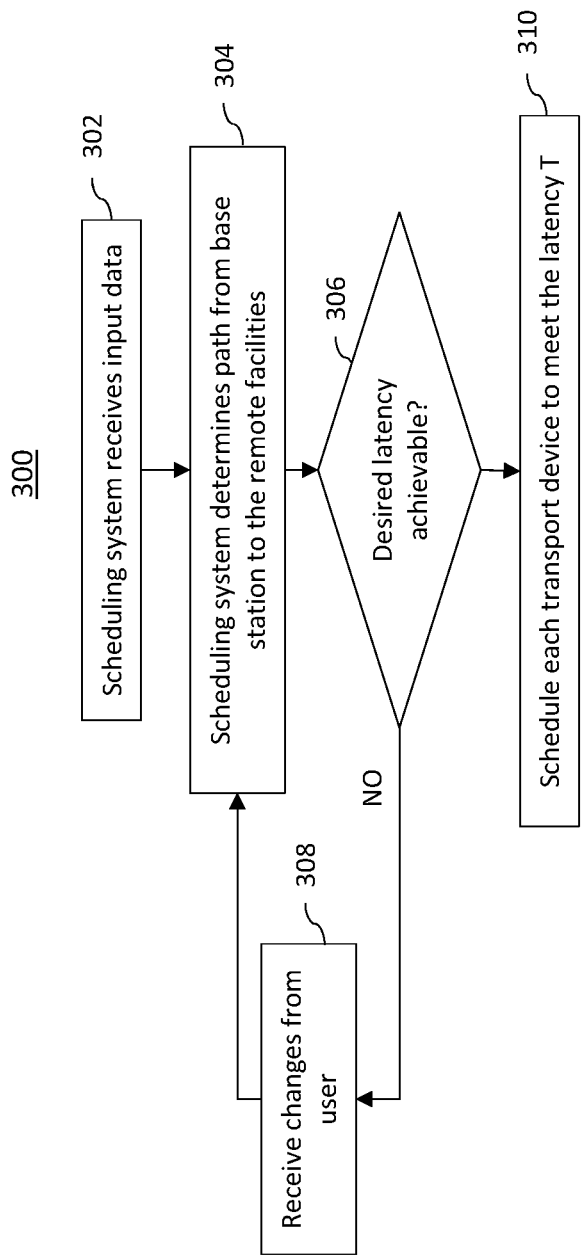
FIG. 3 depicts a flowchart of a method for scheduling transport devices for providing network connectivity according to one or more embodiments of the present invention.

FIG. 3 depicts a flowchart of a method for scheduling transport devices for providing network connectivity according to one or more embodiments of the present invention. The method 300 includes receiving an input data that includes at least a predetermined latency that is desired, a number (N) of transport devices 125, and locations of the remote facilities 115 and the base station 105, at block 302. In one or more embodiments of the present invention, additional input data can include information about the transport devices 125, such as speed capacity, charge capacity, and the like. The input data can also include locations of one or more charging stations 150.

The method 300 further includes determining a path 145 from the base station 105 to the remote facilities 115, at block 304. The path 145 can be determined using known navigational algorithms. In one or more embodiments of the present invention, the path 145 can be generated using an application programming interface of a navigation system. The path takes into account the charging stations 150 to facilitate recharging the transport devices 125.

Further, the method 300 includes determining whether the desired latency (T) can be achieved with the N transport devices 125, at block 306. For example, if the time required for a transport device 125 to travel from one point on the path, say the base station 105, to the next point, say a first remote facility 115, is greater than N*T, then the scheduler system 140 cannot meet the desired latency of T with just the N transport devices 125 that are available. Accordingly, the scheduler system 140 requests a user to make necessary changes, such as revise the desired latency or increase the number of transport devices 125, at block 308.

Once the desired latency is achievable, the scheduler system 140 schedules the multiple transport devices 125 continuously from the base station 105 to the remote facilities and back at a regular patterned schedule such that the time duration between two transport devices 125 reaching a remote facility 115 is at most T seconds, at block 310. Scheduling a transport device 125 includes specifying a start time and a destination for the transport device 125. Further, the scheduling can include providing navigational directions to the transport device 125. In one or more embodiments of the present invention, the scheduling also includes scheduling stops for recharging the transport device 125 at one or more of the charging stations 150. The scheduler system 140 can determine the recharging stops based on historical data that includes a charging capacity, a recharging time, and a range (e.g., miles per recharge) etc. for the transport device 125.

Accordingly, the scheduler system 140 facilitates the transport devices 125 to provide network connectivity to the remote facilities 115 at a desired latency T, and ensuring that the transport devices are recharged and available to transport the outbound and inbound data continuously.

In one or more embodiments of the present invention, the scheduler system 140 can conserve energy and be more efficient with the cost savings for providing the network connectivity. For example, the scheduler system 140 can schedule the transport devices 125 based on usage patterns of the network connectivity at the remote facilities that are served by the transport devices 125.

Figure 4:
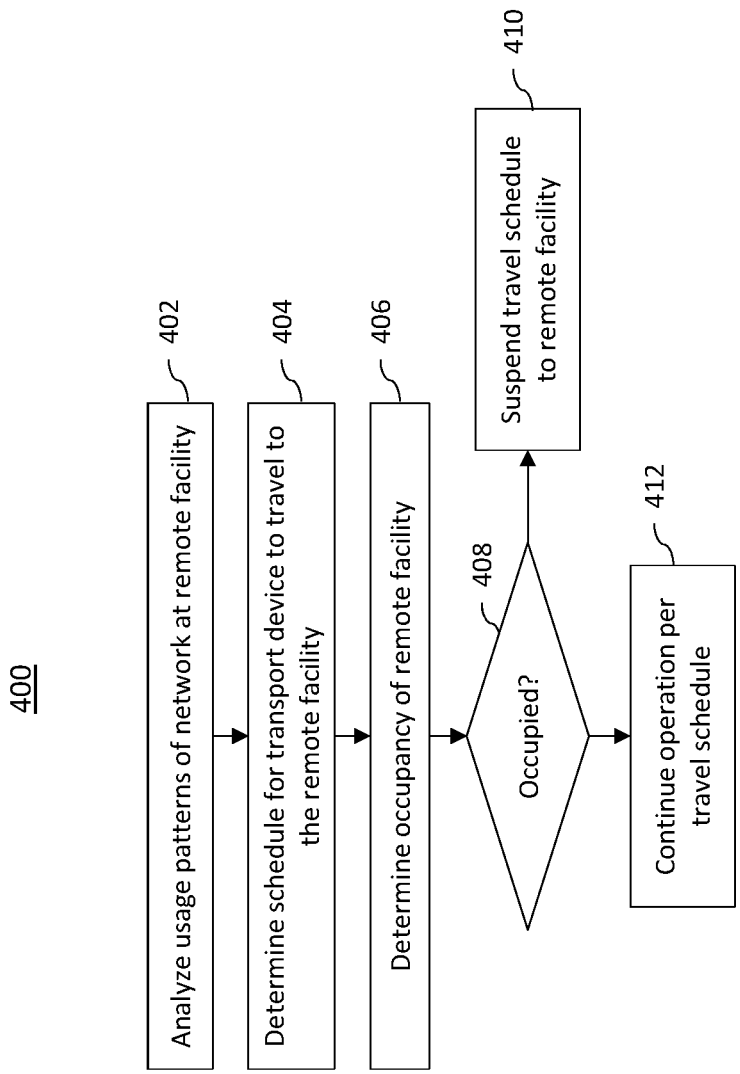
FIG. 4 depicts a flowchart for a method for improving cost efficiency of transport devices for providing network connectivity according to one or more embodiments of the present invention.

FIG. 4 depicts a flowchart for a method for improving cost efficiency of transport devices for providing network connectivity according to one or more embodiments of the present invention. The method 400 includes monitoring and analyzing usage pattern of the network by a remote facility 115 via the transport devices 125, at block 402. Analyzing the usage pattern can include determining a particular time of day when the remote facility 115 does not transmit/receive any data. For example, the remote facility 115 can be a house, where everyone is out for work from 9 AM to 5 PM, resulting in substantially 0 network traffic during those hours. In another example, the remote facility 115 can be a farm and no one is using the network between 9 PM to 5 AM at the farm. Various other examples are possible. Additionally, the analysis can include identifying that the network usage is higher during a particular time of day compared to other times of the day. For example, in the above example where the remote facility 115 is a house, the network usage may peak during 6 PM to 9 PM when everyone in the house is using the network for streaming media, browsing, e-commerce, homework, etc.

The scheduler system 140 determines a schedule for the transport devices 125 to travel to the remote facility 115 according to the usage pattern, at block 404. In one or more embodiments of the present invention, the scheduler system 140 can increase the frequency of the transport devices 125 to the remote facility 115, accordingly, reducing the latency and in turn improving the network service to the consumers.

The method 400 further includes monitoring whether a particular remote facility is occupied at a particular time when the transport devices 125 are scheduled to travel to the remote facility 115, at block 406. For example, the edge server 117 determines if any communication device 118 is presently connected to the edge server 117. The edge server 117 indicates to the transport device 125 communication devices 118 are not present at the remote facility 115 at this time. Alternatively, or in addition, the remote facility 115 can be equipped with one or more occupancy sensors (not shown), such as a motion sensors. The transport device 125, upon traveling to the remote facility 115, receives a communication from the occupancy sensors to determine whether one or more users are present at the remote facility 115. The transport device 125, in turn, relays such occupancy information, either from the edge server 117 or the occupancy sensor, or both, to the scheduler system 140, which can suspend the schedule for the transport devices 125 traveling to the remote facility 115 for a predetermined duration, at blocks 408 and 410. The scheduler system 140 can resume the schedule after the predetermined duration, and repeat the method 400, if required. If the remote facility 115 is occupied, the transport devices 125 continue to operate according to the travel schedule, at block 412.

Figure 5:
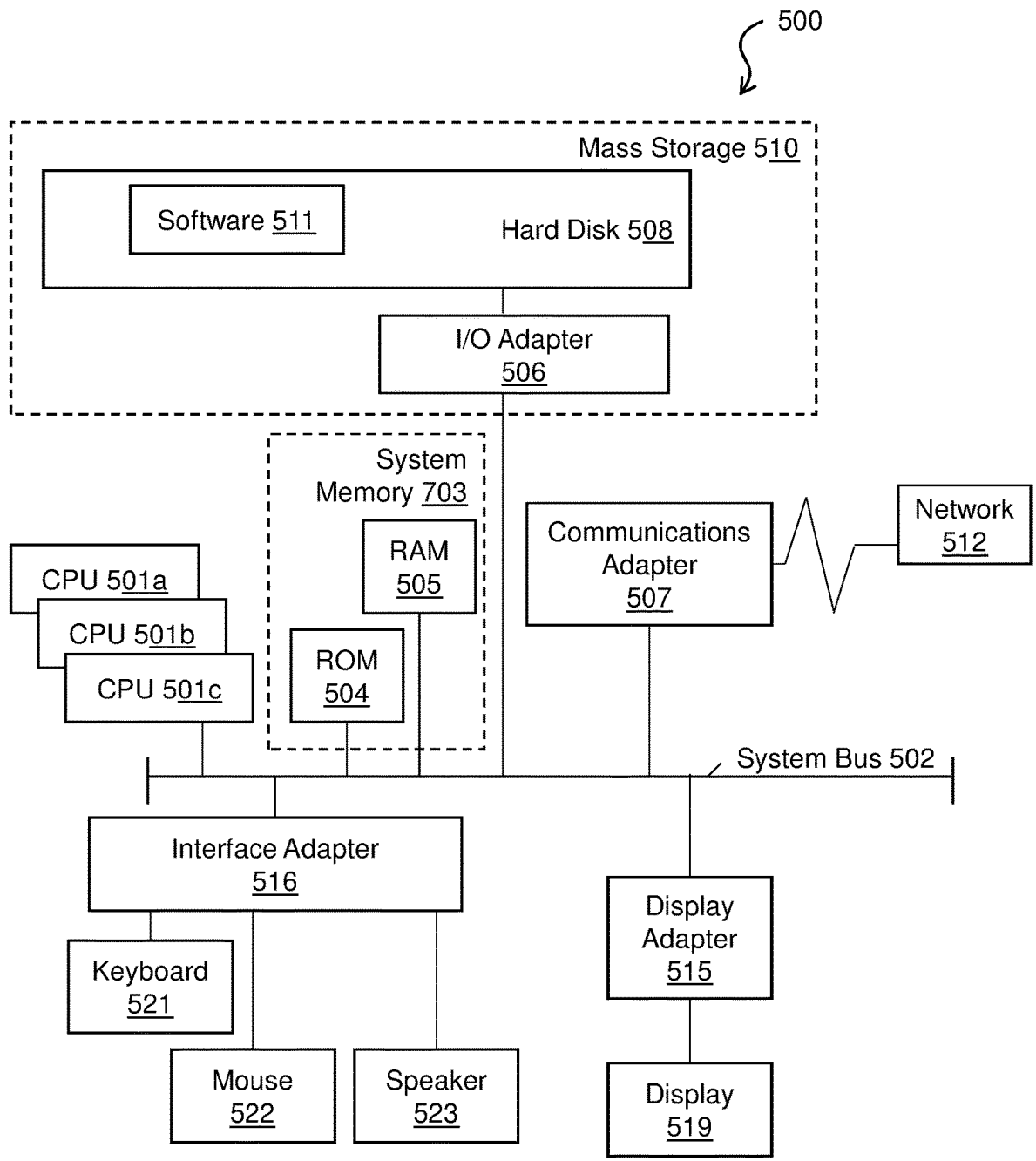
FIG. 5 depicts a computer system that may be used in one or more embodiments of the present invention.

Turning now to FIG. 5, a computer system 500 is generally shown in accordance with an embodiment. The computer system 500 can implement any of the components described in FIG. 1, such as the scheduling system, the edge server, the mobile access point, the communication device, and the like. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein below with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A keyboard 521, a mouse 522, a speaker 523, etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the keyboard 521 and the mouse 522, and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A computer-implemented method for delivering network connectivity, the computer-implemented method comprising:
   receiving, by an edge server, a set of communication packets from a communication device;
   storing, by the edge server, the set of communication packets as part of outbound data;
   determining, by the edge server, that a mobile access point is within a communicable range of the edge server, the mobile access point travels back and forth between the edge server and a base station; and
   transmitting, by the edge server, the outbound data to the mobile access point that is within the communicable range.

2. The computer-implemented method of claim 1, further comprising, receiving, by the edge server, inbound data from the mobile access point.

3. The computer-implemented method of claim 2, wherein:
   the set of communication packets comprises a first set of communication packets;
   the inbound data comprises a second set of communication packets; and
   the computer-implemented method further comprises relaying, by the edge server, the second set of communication packets to the communication device.

4. The computer-implemented method of claim 2, wherein:
   the set of communication packets comprises a first set of communication packets; and
   the inbound data is in response to a third set of communication packets from the communication device that the edge server transmitted to the mobile access point during a previous trip of the mobile access point to the edge server.

5. The computer-implemented method of claim 1, wherein the mobile access point comprises a plurality of mobile access points.

6. The computer-implemented method of claim 1, wherein the mobile access point is equipped on an automated vehicle that travels back and forth between the edge server and the base station.

7. The computer-implemented method of claim 1 further comprising, scheduling by a scheduler system, a plurality of mobile access points to travel to the edge server according to a predetermined schedule wherein one of the mobile access points reaches the edge server every T seconds, T being a predetermined duration.

8. A system comprising:
   a communication device; and
   an edge server that performs a method for delivering network connectivity, the method comprising:
      receiving a set of communication packets from the communication device;
      storing the set of communication packets as part of outbound data;
      determining that a mobile access point is within a communicable range with the edge server, the mobile access point travels back and forth between the edge server and a base station; and
      transmitting the outbound data to the mobile access point that is in the communicable range.

9. The system of claim 8, wherein the method further comprises, receiving inbound data from the mobile access point.

10. The system of claim 9, wherein:
    the set of communication packets is a first set of communication packets;
    the inbound data comprises a second set of communication packets; and
    the computer-implemented method further comprises relaying, by the edge server, the second set of communication packets to the communication device.

11. The system of claim 9, wherein:
    the set of communication packets is a first set of communication packets; and
    the inbound data is in response to a third set of communication packets from the communication device that the edge server transmitted to the mobile access point during a previous trip of the mobile access point to the edge server.

12. The system of claim 8, wherein the mobile access point comprises a plurality of mobile access points.

13. The system of claim 8, wherein the mobile access point is equipped on an automated vehicle that travels back and forth between the edge server and the base station.

14. The system of claim 8, wherein the method further comprises, scheduling, by a scheduler system, a plurality of mobile access points to travel to the edge server according to a predetermined schedule wherein one of the mobile access points reaches the edge server every T seconds, T being a predetermined duration.

15. A computer program product comprising a computer-readable storage media having computer-executable instructions stored thereupon, which when executed by a processor cause the processor to perform a method for delivering network connectivity, the method comprising:
    receiving a set of communication packets from a communication device;
    storing the set of communication packets as part of outbound data;
    determining that a mobile access point is in communicable range with the edge server, the mobile access point travels back and forth between the edge server and a base station; and
    transmitting the outbound data to the mobile access point that is in the communicable range.

16. The computer program product of claim 15, wherein the method further comprises, receiving inbound data from the mobile access point.

17. The computer program product of claim 16, wherein the set of communication packets is a first set of communication packets, the inbound data comprises a second set of communication packets, and the computer-implemented method further comprising:
   relaying the second set of communication packets to the communication device.

18. The computer program product of claim 16, wherein:
   the set of communication packets is a first set of communication packets;
   the inbound data is in response to a third set of communication packets from the communication device that the edge server transmitted to the mobile access point during a previous trip of the mobile access point to the edge server.

19. The computer program product of claim 15, wherein the mobile access point is equipped on an automated vehicle that travels back and forth between the edge server and the base station.

20. The computer program product of claim 15, wherein the method further comprises, scheduling, by a scheduler system, a plurality of mobile access points to travel to the edge server according to a predetermined schedule wherein one of the mobile access points reaches the edge server every T seconds, T being a predetermined duration.

\* \* \* \* \*